US012583053B2

(12) United States Patent
Büchel et al.

(10) Patent No.: US 12,583,053 B2
(45) Date of Patent: Mar. 24, 2026

(54) ULTRASONIC SONOTRODES, METHOD FOR PRODUCING ULTRASONIC SONOTRODES, AND METHOD FOR WELDING

(71) Applicant: Telsonic Holding AG, Bronschhofen (CH)

(72) Inventors: Pascal Büchel, Sirnach (CH); Marco Bühler, Wattwil (CH)

(73) Assignee: Telsonic Holding AG, Bronschhofen (CH)

( * ) Notice: Subject to any disclaimer, the term of this patent is extended or adjusted under 35 U.S.C. 154(b) by 0 days.

(21) Appl. No.: 18/698,843

(22) PCT Filed: Oct. 8, 2021

(86) PCT No.: PCT/EP2021/077857
§ 371 (c)(1),
(2) Date: Apr. 5, 2024

(87) PCT Pub. No.: WO2023/057072
PCT Pub. Date: Apr. 13, 2023

(65) Prior Publication Data
US 2025/0153263 A1      May 15, 2025

(51) Int. Cl.
*B23K 20/00*      (2006.01)
*B23K 20/10*      (2006.01)
(Continued)

(52) U.S. Cl.
CPC ....... *B23K 20/106* (2013.01); *H01M 10/0431* (2013.01); *B23K 2101/36* (2018.08)

(58) Field of Classification Search
CPC .............................. B23K 20/106; B23K 20/10
See application file for complete search history.

(56) References Cited

U.S. PATENT DOCUMENTS 3,990,452 A * 11/1976 Murry ................. A61F 9/00745
                                            606/169
5,662,766 A *  9/1997 Ishikawa ............. B29C 66/8167
                                            156/580.2
(Continued)

FOREIGN PATENT DOCUMENTS

DE            196 15 681 A1      11/1996
DE      10 2015 105 038 A1      10/2015
(Continued)

OTHER PUBLICATIONS

DE19615681A1 computer English translation (Year: 2025).*
(Continued)

*Primary Examiner* — Erin B Saad
(74) *Attorney, Agent, or Firm* — Finch & Maloney PLLC

(57)          ABSTRACT

An ultrasonic sonotrode (10) is disclosed, comprising a base body (1) with a coupling surface (3) for coupling ultrasonic vibrations and a processing pin (2) extending along a longitudinal axis (L) with a working surface (4) for emitting the ultrasonic vibrations to a component (21), in particular a welding surface (4) for welding the component (21). The processing pin (2) is connected to the base body (1) by material bonding and/or force fitting. Also disclosed is a method of manufacturing such an ultrasonic sonotrode (10). The method includes a step in which the processing pin (2) is connected to the base body (1) by material bonding and/or force fitting. Also disclosed is a method of welding at least two components (21) by means of the ultrasonic sonotrode (10).

13 Claims, 2 Drawing Sheets

Figure 1:
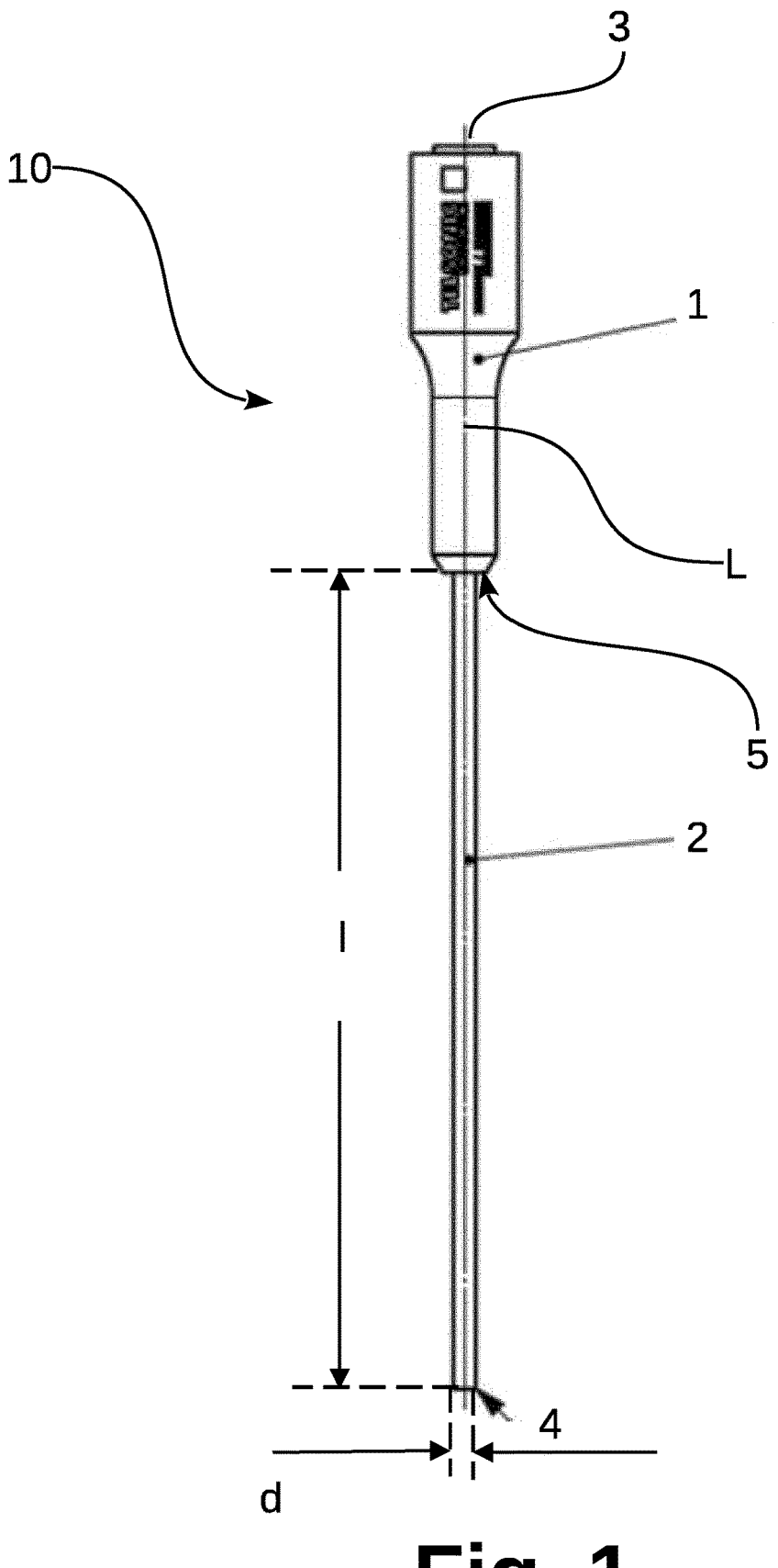

(51) Int. Cl.
    *H01M 10/04*       (2006.01)
    *B23K 101/36*     (2006.01)

(56)               References Cited

U.S. PATENT DOCUMENTS

| | | | |
|---|---|---|---|
| 5,820,011 A | 10/1998 | Ito et al. | |
| 9,724,781 B2 | 8/2017 | Hielscher et al. | |
| 11,626,677 B2 * | 4/2023 | Tolentino | H01L 23/49827 |
| | | | 439/65 |
| 2002/0193798 A1 * | 12/2002 | Oh | A61C 1/07 |
| | | | 606/169 |
| 2006/0004396 A1 * | 1/2006 | Easley | A61B 17/1659 |
| | | | 606/169 |
| 2013/0040261 A1 * | 2/2013 | Kwon | A61C 3/03 |
| | | | 433/102 |
| 2021/0359445 A1 * | 11/2021 | Tolentino | H01L 23/49827 |

FOREIGN PATENT DOCUMENTS

| | | | |
|---|---|---|---|
| DE | 10 2014 226 212 A1 | 6/2016 | |
| DE | 10 2015 219 908 A1 | 4/2017 | |
| WO | 2005/091403 A1 | 9/2005 | |

OTHER PUBLICATIONS

DE102014226212A1 computer English translation (Year: 2025).*
International Search Report Corresponding to PCT/EP2021/077857 mailed Jun. 10, 2022.
Written Opinion Corresponding to PCT/EP2021/077857 mailed Jun. 10, 2022.

* cited by examiner

ULTRASONIC SONOTRODES, METHOD FOR PRODUCING ULTRASONIC SONOTRODES, AND METHOD FOR WELDING

The present invention relates to ultrasonic sonotrodes, methods of manufacturing ultrasonic sonotrodes and methods of welding.

Such ultrasonic sonotrodes are used, for example, in the production of battery cells, in particular so-called "jelly roll battery cells". These contain several foils that are wound onto a common winding mandrel. The winding mandrel is welded to the housing of the battery cell using ultrasound. Depending on the width of the foils, the wound jelly rolls currently have heights of 90 mm, for example, although these dimensions continue to increase. This makes it more difficult to access the areas intended for ultrasonic welding.

It would be conceivable to simply increase the length of the sonotrode in order to gain access to the welding points. However, this would result in relatively high material and manufacturing costs.

It is therefore a task of the present invention to provide ultrasonic sonotrodes with which the disadvantages described can be overcome. In particular, it should be possible to use the sonotrode to connect components at welding points that are difficult to access. Nevertheless, the material and manufacturing costs should be as low as possible.

These and other tasks are solved, in a first aspect of the invention, by an ultrasonic sonotrode. This ultrasonic sonotrode contains a base body with a coupling surface for coupling ultrasonic vibrations and a processing pin extending along a longitudinal axis with a working surface for emitting the ultrasonic vibrations to a component. The working surface can, for example, be a welding surface for welding the component.

According to the invention, the processing pin is connected to the base body by material bonding and/or force fitting.

The at least two-part structure of the ultrasonic sonotrode enables it to be adapted to the geometries required for the specific application by selecting the appropriate materials and dimensions, particularly of the processing pin. As will be explained below, the processing pin can have a length along the longitudinal axis that corresponds to an integer multiple of half the resonance wavelength. By selecting a material with a suitable sound velocity, the length can be made possible in accordance with the external specifications. Furthermore, several designs of the processing pins can be combined with one and the same design of the base body at the factory, which reduces the number of different components required for production.

The material bonding and/or force fitting of the processing pin to the base body ensures a largely loss-free transmission of the sound energy from the base body to the processing pin and thus to the component than would be possible with a screw connection, for example. In addition, the low tolerances required for ultrasonic welding cannot be achieved with screw connections.

In one possible embodiment, the processing pin is connected to the base body by pressing it into a press-in opening formed in the base body. This type of connection has proven to be particularly simple and yet reliable.

Alternatively or additionally, the processing pin can be connected to the base body by laser welding.

Advantageously, the processing pin is shaped like a circular cylinder, at least in sections or even as a whole. This makes it possible to provide the processing pin from a rod-shaped material in a cost-effective and simple manner. Also covered by the invention are processing pins which have a stepped peripheral surface and/or are hollow.

In preferred embodiments, the processing pin is made of a metal. For example, the metal may be steel, titanium or aluminum. In the case of steel in particular, the length of the processing pin can be in the range from 60 mm to 200 mm, preferably in the range from 70 mm to 180 mm. If, for example, torsional vibrations with a resonance frequency of 20 kHz are used, a half wavelength is approximately 80 mm and a full wavelength is approximately 160 mm.

Alternatively, the processing pin can contain or consist of a hard metal, for example tungsten carbide, possibly with cobalt as a binder. As the sound velocities in typical hard metals are lower than those in steel, processing pins with a greater length can be used, for example in the range of 100 mm to 300 mm, preferably in the range of 120 mm to 280 mm. In this way, welding can also be carried out in places that are even more difficult to access.

In other embodiments, the processing pin can also consist of a ceramic.

Lower resonant frequencies of 15 kHz, for example, also enable longer processing pins. However, the invention also includes processing pins that have higher resonant frequencies of up to 40 kHz, for example.

In some embodiments, the processing pin can be provided with a wear-resistant coating.

For a suitable compromise between accessibility and rigidity, it has proven to be favorable when the processing pin has a diameter in the range of 2 mm to 10 mm, preferably in the range of 3 mm to 7 mm.

The base body can be made of titanium, steel or aluminum, for example.

The sonotrode can, for example, be designed as a torsional sonotrode which can be excited to torsional vibrations around its longitudinal axis. Of course, the invention also includes longitudinal sonotrodes which can be excited to vibrate longitudinally along the longitudinal axis.

Particularly in the case of a torsion sonotrode, it is advantageous when the working surface is formed on an end face of the processing pin opposite the base body. Alternatively or additionally, however, a working surface can also be arranged on a circumferential surface of the processing pin.

In a further aspect, the invention relates to a method of manufacturing an ultrasonic sonotrode according to the invention as described above. This method contains a step in which the processing pin is connected to the base body by material bonding and/or force fitting. As has already been explained, this can be done, for example, by pressing the processing pin into a pressin opening formed in the base body and/or by laser welding.

Still another aspect of the invention relates to a method of welding at least two components by means of an ultrasonic sonotrode according to the invention as described above. This method includes a step in which the working surface of the ultrasonic sonotrode is brought into contact with at least one of the components in order to weld the components by means of ultrasound, in particular to weld them together.

The welded components can be made of copper, aluminium, plastic or metallized ceramic, for example.

In the application mentioned at the beginning, a first of the components may be a winding mandrel of a jelly roll battery cell and a second of the components may be a battery housing of the battery cell. However, the sonotrode according to the invention can also be used, for example, for welding battery pouches, capacitors, IGBTs (insulated-gate bipolar transistors) or other semiconductor components if welding has to be carried out in places that are difficult to access.

Figure 2:
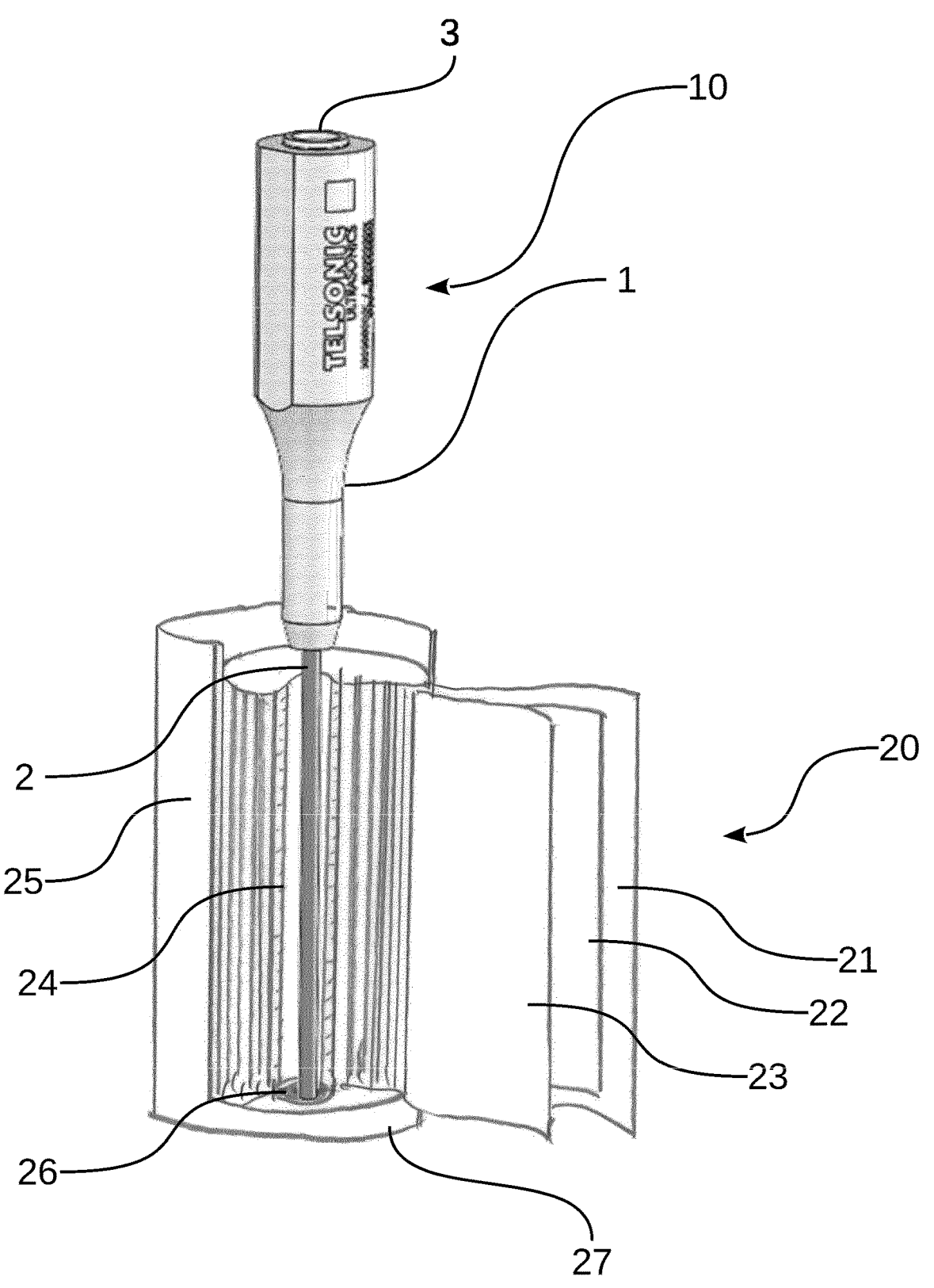

In the following, the invention is explained in more detail with reference to an embodiment example and some drawings. They show:

FIG. 1: a side view of an ultrasonic sonotrode according to the invention;

FIG. 2: a schematic representation of a process according to the invention for welding a jelly roll battery cell.

The ultrasonic sonotrode 10 shown in FIG. 1 has a base body 1 with a coupling surface 3 for coupling ultrasonic vibrations and a processing pin 2 extending along a longitudinal axis L with a welding surface 4 for emitting the ultrasonic vibrations to a component not shown here (see FIG. 2). The welding surface 4 is arranged on an end face of the processing pin 2 opposite the base body 1. The processing pin 2 is connected to the base body 1 by pressing it into a press-in opening 5 formed in the base body 1. Alternatively, the connection could be created by laser welding, for example.

The processing pin 2 has an overall circular cylindrical shape. It can have thicknesses in the range from 3 mm to 6 mm, for example. If the processing pin 2 is made of steel, for example, it can have a length 1 of 80 mm or 160 mm, which corresponds to a half or full wavelength at a resonance frequency of 20 KHz. If, on the other hand, the processing pin 2 is made of a hard metal such as tungsten carbide, the half wavelength at the frequency mentioned is approximately 130 mm. In the example shown here, the base body 1 is made of titanium and has a length that corresponds to half the wavelength in this material in this example.

FIG. 2 shows a method according to the invention for welding two components. These are components of a jelly roll battery cell 20. In the preceding steps, which are not a mandatory part of the method according to the invention and are therefore not shown, several foils (an anode foil 21, a separating foil 22 and a cathode foil 23) are wound on a common winding mandrel 24. The resulting intermediate product is then inserted into a battery housing 25. The winding mandrel 24 is hollow and has a cover surface 26 at the end shown below.

In the step according to the invention shown in FIG. 2, the processing pin 2 of the ultrasonic sonotrode 10 is inserted into the cavity of the winding mandrel 24 until the welding surface 4 rests on the upper side of the cover surface 26. If torsional vibrations are then introduced into the coupling surface 3, these are transmitted to the welding surface 4, whereby a lower side of the cover surface 26 welds to an upper side of a base 27 of the battery housing 25.

The invention claimed is:

1. An ultrasonic sonotrode, containing a base body with a coupling surface for coupling ultrasonic vibrations and a processing pin extending along a longitudinal axis (L) and having a working surface for emitting the ultrasonic vibrations to a component,
   wherein the processing pin is connected to the base body by material bonding and/or force locking, wherein the processing pin comprises a hard metal, wherein the processing pin has a length in the range from 100 mm to 300 mm, and wherein the processing pin has a diameter which is in the range of 2 mm to 10 mm.

2. The ultrasonic sonotrode according to claim 1, wherein the working surface is adapted for welding the component.

3. The ultrasonic sonotrode according to claim 1, wherein the processing pin is connected to the base body by being pressed into a press-in opening formed in the base body.

4. The ultrasonic sonotrode according to claim 1, wherein the processing pin is connected to the base body by laser welding.

5. The ultrasonic sonotrode according to claim 1, wherein the processing pin is at least sectionally formed in the shape of a circular cylinder.

6. The ultrasonic sonotrode according to claim 1, wherein the hard metal is tungsten carbide.

7. The ultrasonic sonotrode according to claim 1, wherein the sonotrode is designed as a torsional sonotrode which can be excited to torsional vibrations about the longitudinal axis (L).

8. The ultrasonic sonotrode according to claim 1, wherein the working surface is formed on an end face of the processing pin opposite the base body.

9. A method of manufacturing an ultrasonic sonotrode according to claim 1, comprising a step in which the processing pin is connected to the base body by material bonding and/or force locking.

10. The method according to claim 9, wherein the processing pin is connected to the base body by being pressed into a press-in opening formed in the base body.

11. A method for welding at least two components by means of an ultrasonic sonotrode according to claim 1, wherein the working surface of the ultrasonic sonotrode is brought into contact with at least one of the components and ultrasonic vibrations are coupled into the coupling surface in order to weld the components by means of ultrasound.

12. The method according to claim 11, wherein the components are welded together by the ultrasonic vibrations.

13. The method according to claim 11, wherein a first of the components is a winding mandrel of a jelly roll battery cell and a second of the components is a battery housing of the battery cell.

\* \* \* \* \*